US010780535B2

(12) United States Patent
Huang et al.

(10) Patent No.: US 10,780,535 B2
(45) Date of Patent: Sep. 22, 2020

(54) AUTOMATIC SCREW TIGHTENING MODULE AND ROBOT MANIPULATOR EMPLOYING SAME

(71) Applicant: DELTA ELECTRONICS, INC., Taoyuan (TW)

(72) Inventors: Chi-Jung Huang, Taoyuan (TW); Tzu-Min Yi, Taoyuan (TW); Chih-Cheng Peng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 545 days.

(21) Appl. No.: 15/415,266

(22) Filed: Jan. 25, 2017

(65) Prior Publication Data
US 2018/0021900 A1  Jan. 25, 2018

Related U.S. Application Data

(60) Provisional application No. 62/365,004, filed on Jul. 21, 2016.

(30) Foreign Application Priority Data

Nov. 29, 2016 (TW) .............................. 105139212 A

(51) Int. Cl.
*B23P 19/06* (2006.01)
*B25J 13/08* (2006.01)
(Continued)

(52) U.S. Cl.
CPC .......... *B23P 19/066* (2013.01); *B25J 9/1679* (2013.01); *B25J 13/085* (2013.01); *B25J 13/088* (2013.01);
(Continued)

(58) Field of Classification Search
CPC ....... B23P 19/06; B23P 19/066; B25J 9/1679; B25J 13/085; B25J 13/088; B25J 15/0019;
(Continued)

(56) References Cited

U.S. PATENT DOCUMENTS 2,880,770 A * 4/1959 Ettinger .................. B23P 19/06
81/429
3,333,613 A * 8/1967 Bosse ..................... B23P 19/06
470/3
(Continued)

FOREIGN PATENT DOCUMENTS

CN    104907816 A    9/2015
TW    M517668 U     2/2016

*Primary Examiner* — Hemant Desai
*Assistant Examiner* — Veronica Martin
(74) *Attorney, Agent, or Firm* — Kirton McConkie; Evan R. Witt

(57) ABSTRACT

An automatic screw tightening module includes a plate assembly, an input module, a screwdriver module, a transmission module, a movable module, an elastic element and a position sensor. The screwdriver module includes a screwdriver and a screwdriver sleeve. The transmission module is connected with an input terminal of the input module and the screwdriver sleeve for allowing the input terminal, the transmission module and the screwdriver sleeve to be rotated synchronously. The movable module is movably disposed on a base plate of the plate assembly. The movable module includes a bearing, and portion of the screwdriver sleeve is accommodated in the bearing, so that the screwdriver module and the movable module are moved relative to the base plate. The elastic element is disposed on the base plate and connected with the movable module. The position sensor is disposed on the base plate for sensing a displacement of the movable module.

13 Claims, 18 Drawing Sheets

(51) Int. Cl.
*B25J 9/16* (2006.01)
*B25J 15/00* (2006.01)
*G05B 19/18* (2006.01)
*B25J 17/02* (2006.01)

(52) U.S. Cl.
CPC ....... *B25J 15/0019* (2013.01); *B25J 17/0225* (2013.01); *G05B 19/186* (2013.01); *G05B 2219/32181* (2013.01); *G05B 2219/40072* (2013.01); *G05B 2219/45091* (2013.01)

(58) Field of Classification Search
CPC ............... B25J 17/0225; G05B 19/186; G05B 2218/32181; G05B 2218/40072; G05B 2218/5091
USPC .................... 173/2–11, 90, 176–183, 213
See application file for complete search history.

(56) References Cited

U.S. PATENT DOCUMENTS

| | | | | |
|---|---|---|---|---|
| 6,003,229 A | * | 12/1999 | Beduhn | B23P 19/066 29/407.02 |
| 2013/0067711 A1 | * | 3/2013 | Harada | B23P 19/06 29/407.01 |
| 2014/0223712 A1 | * | 8/2014 | Ikeda | B21J 15/142 29/243.521 |

* cited by examiner

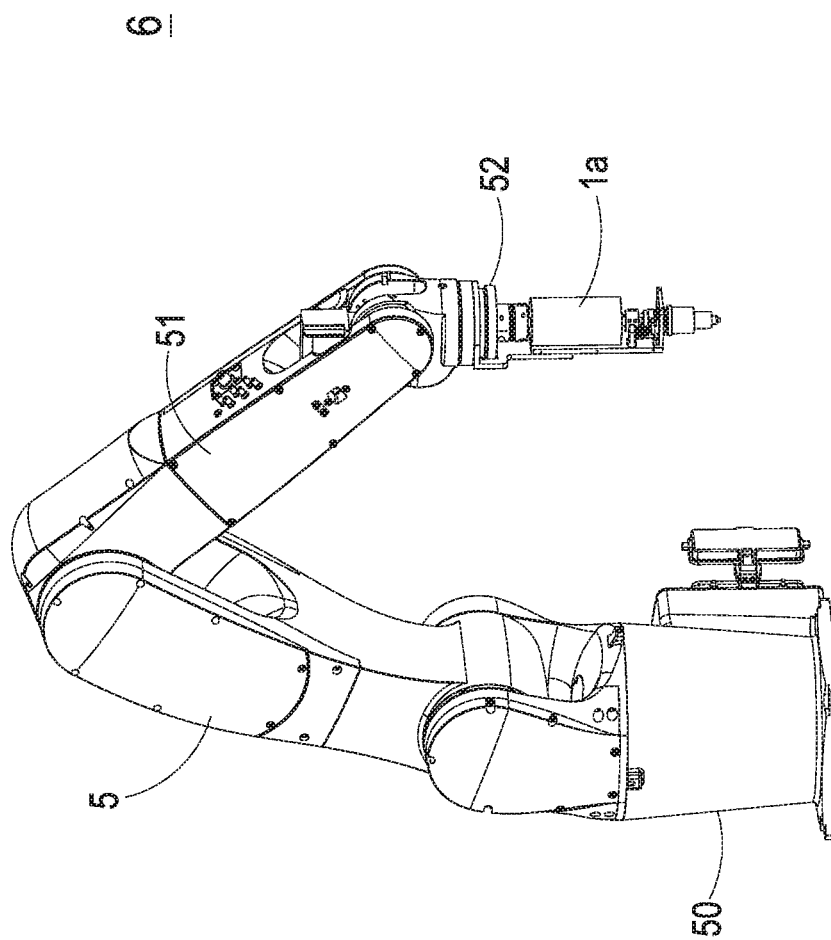

AUTOMATIC SCREW TIGHTENING MODULE AND ROBOT MANIPULATOR EMPLOYING SAME

CROSS-REFERENCE TO RELATED APPLICATION

This application claims the benefit of U.S. Provisional Application No. 62/365,004 filed on Jul. 21, 2016, and entitled "AUTOMATIC SCREW TIGHTENING MODULE AND ROBOT MANIPULATOR EMPLOYING SAME", the entirety of which is hereby incorporated by reference.

FIELD OF THE INVENTION

The present invention relates to a screw tightening module, and more particularly to an automatic screw tightening module and a robot manipulator employing the same.

BACKGROUND OF THE INVENTION

With increasing development of industries, various automatic machineries have been developed to replace manpower, increase production speed and reduce costs. Assembly of electronic product usually requires screws to fasten objects (i.e. workpieces) together. Generally, automatic screw tightening device is employed to tighten screws onto the objects for improving production efficiency and reducing cost.

When the automatic screw tightening device is employed to fasten screws onto the objects, there are several factors needed to be considered for preventing damages of the objects during the screwing operations performed by the automatic screw tightening device. The factors include the applied force on the object exerted by the automatic screw tightening device, the screw tightening condition between the screw and the screwing hole of the object (for example slip teeth, ramp locking, or non-tightening locking), the torque for fastening the screw, and etc.

At present, industrial screwing robots have been applied in various product lines. Generally, the industrial screwing robot includes an articulated arm and a screwing driver. The screwing driver is mounted on the articulated arm for fastening the screws onto the objects. However, such industrial screwing robot is a single-purpose machine and can't be applied to other purposes. Consequently, the cost is high. In addition, the objects may be placed on a work platform with different heights. In order to avoid that the industrial screwing robot damages the objects due to excessive applied forces on the objects with different heights, a buffer mechanism is installed within the screwing driver or coupled between the screwing driver and the articulated arm. The buffer mechanism may be a spring or a pneumatic cylinder. However, the screw tightening positions of the objects can't be acquired accurately by using the above-mentioned method, and the screw tightening conditions between the screws and the screwing holes of the objects may be misjudged due to the use of spring or pneumatic cylinder.

Therefore, there is a need of providing an automatic screw tightening module and a robot manipulator employing the same to obviate the drawbacks encountered from the prior arts.

SUMMARY OF THE INVENTION

It is an object of the present invention to provide an automatic screw tightening module and a robot manipulator employing the same with reduced cost. By using the inventive automatic screw tightening module and the robot manipulator, the screw tightening positions of the objects can be acquired accurately, and the applied forces on the objects can be well controlled for avoiding the damages of the objects. In addition, the automatic screw tightening module can be detachably coupled to the distal end of the articulated arm easily or can be additionally mounted to the articulated arm without changing the original structure and circuit of the robot manipulator. The screw tightening module of the robot manipulator can be replaced with other tools on the distal end of the articulated arm for performing required tasks. Consequently, the cost is reduced.

In accordance with one aspect of the present invention, an automatic screw tightening module is provided and includes a plate assembly, an input module, a screwdriver module, a transmission module, a movable module, an elastic element and a position sensor. The plate assembly includes a base plate. The input module includes an input terminal. The screwdriver module includes a screwdriver and a screwdriver sleeve, and the screwdriver is securely coupled with the screwdriver sleeve. The transmission module is connected with the input terminal and the screwdriver sleeve for allowing the input terminal, the transmission module and the screwdriver sleeve to be rotated synchronously. The movable module is movably disposed on the base plate. The movable module includes a bearing, and portion of the screwdriver sleeve is accommodated in the bearing, so that the screwdriver module and the movable module are coupled with each other and moved relative to the base plate. The elastic element is disposed on the base plate and connected with the movable module. The position sensor is disposed on the base plate for sensing a displacement of the movable module.

In accordance with the other aspect of the present invention, a robot manipulator is provided and includes an articulated arm and an automatic screw tightening module. The articulated arm includes an axle end. The automatic screw tightening module is detachably coupled to the axle end of the articulated arm, and includes a plate assembly, an input module, a screwdriver module, a transmission module, a movable module, an elastic element and a position sensor. The plate assembly includes a base plate. The input module includes an input terminal. The screwdriver module includes a screwdriver and a screwdriver sleeve, and the screwdriver is securely coupled with the screwdriver sleeve. The transmission module is connected with the input terminal and the screwdriver sleeve for allowing the input terminal, the transmission module and the screwdriver sleeve to be rotated synchronously. The movable module is movably disposed on the base plate. The movable module includes a bearing, and portion of the screwdriver sleeve is accommodated in the bearing, so that the screwdriver module and the movable module are coupled with each other and moved relative to the base plate. The elastic element is disposed on the base plate and connected with the movable module. The position sensor is disposed on the base plate for sensing a displacement of the movable module.

The above contents of the present invention will become more readily apparent to those ordinarily skilled in the art after reviewing the following detailed description and accompanying drawings, in which:

BRIEF DESCRIPTION OF THE DRAWINGS

FIG. 7 is a schematic perspective view illustrating a robot manipulator according to a fourth embodiment of the present invention, wherein the robot manipulator is equipped with the screw tightening module of FIG. 3B;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
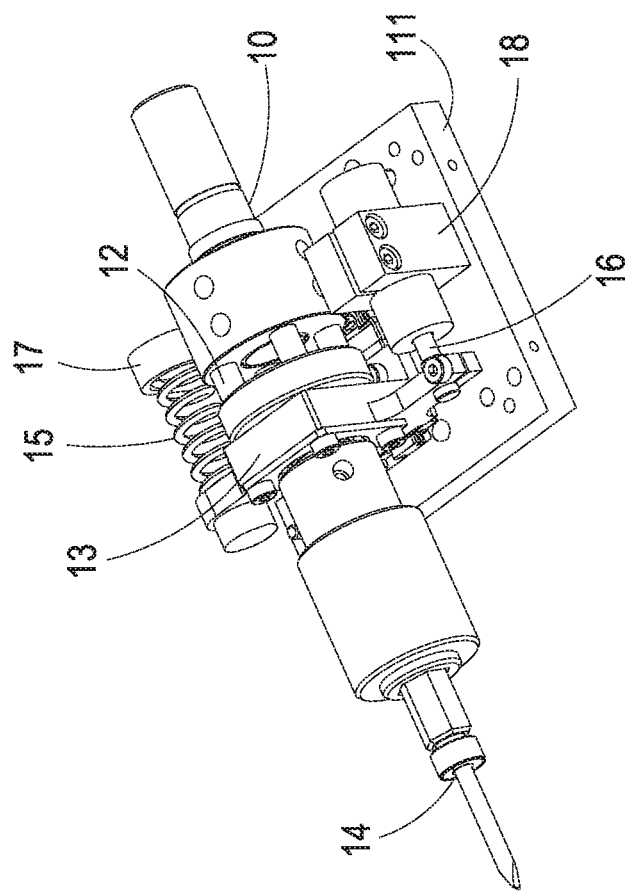
FIG. 1A is a schematic perspective view illustrating an automatic screw tightening module according to a first embodiment of the present invention.
Figure 1B:
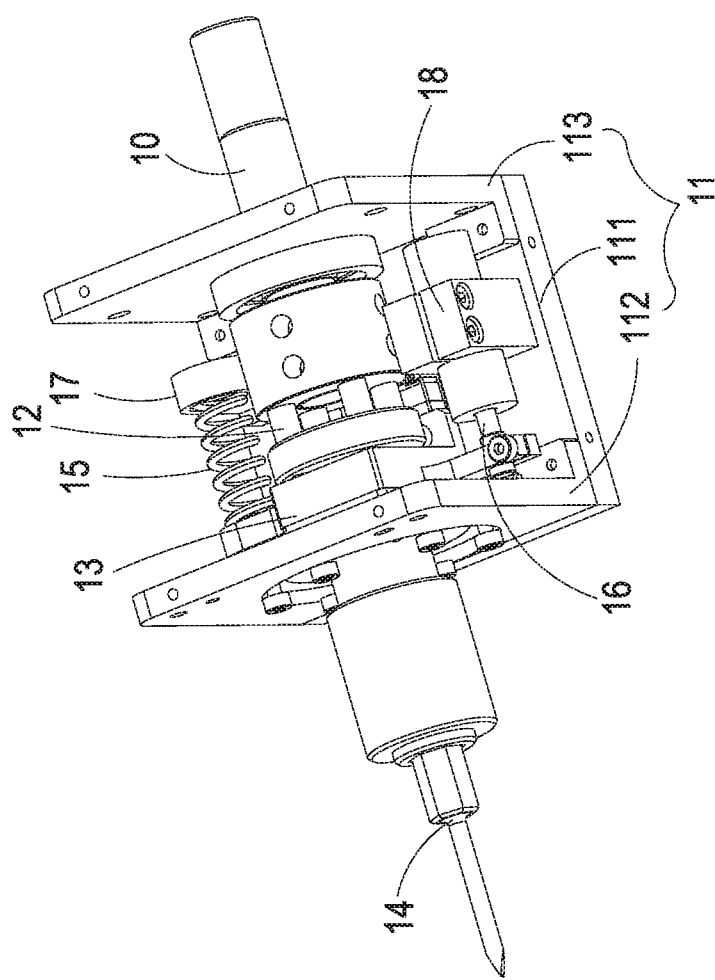
FIG. 1B is a schematic perspective view illustrating the automatic screw tightening module of FIG. 1A, wherein two side support plates are added.
Figure 1C:
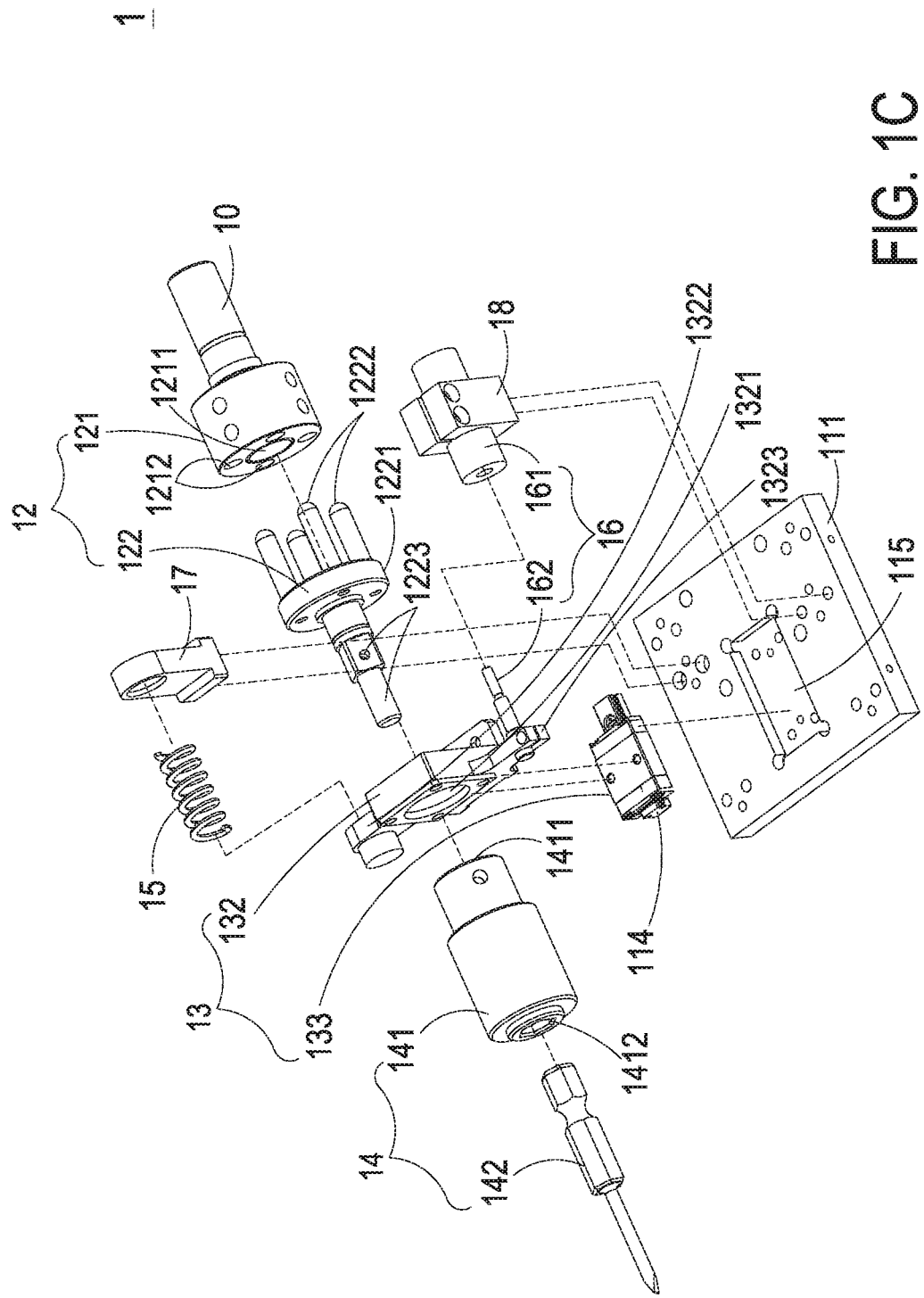
FIG. 1C is an exploded view illustrating the automatic screw tightening module of FIG. 1A.

FIG. 1A is a schematic perspective view illustrating an automatic screw tightening module according to a first embodiment of the present invention; FIG. 1B is a schematic perspective view illustrating the automatic screw tightening module of FIG. 1A, wherein two side support plates are added; and FIG. 1C is an exploded view illustrating the automatic screw tightening module of FIG. 1A. As shown in FIGS. 1A, 1B, and 1C, the automatic screw tightening module 1 is employed to fasten the screws onto the screw holes of the objects (i.e. workpieces). The automatic screw tightening module 1 includes an input module 10, a plate assembly 11, a transmission module 12, a movable module 13, a screwdriver module 14, an elastic element 15, a position sensor 16, a first fixing bracket 17 and a second fixing bracket 18. The plate assembly 11 includes a base plate 111, a first side support plate 112, and a second side support plate 113. The first side support plate 112 and the second side support plate 113 are securely mounted on two side edges of the base plate 111, and the base plate 111, the first side support plate 112 and the second side support plate 113 define an accommodation space for mounting at least the input module 10, the transmission module 12, the movable module 13, the elastic element 15, the position sensor 16, the first fixing bracket 17 and the second fixing bracket 18 therein. The first side support plate 112 is configured to fix the screwdriver module 14, and the second side support plate 113 is configured to support the input module 10. In some embodiments, the first side support plate 112 and the second side support plate 113 can be omitted. The base plate 111 has a recess 115 disposed on the inner surface thereof. In this embodiment, the plate assembly 11 further includes a rail 114 mounted on the inner surface of the base plate 111. Preferably, the rail 114 is securely mounted on the bottom surface of the recess 115.

The input module 10 includes an input terminal. The transmission module 12 includes a driving sleeve 121 and a transmission shaft 122. The driving sleeve 121 includes an axle hole 1211 and a plurality of mounting holes 1212. Portion of the input terminal is accommodated in the axle hole 1211 of the driving sleeve 121, and the input terminal is secured with the driving sleeve 121. Consequently, when the input terminal is rotated by the driving of a motor (not shown), the driving sleeve 121 is rotated synchronously. Preferably but not exclusively, the motor is an electric motor or a pneumatic motor.

The transmission shaft 122 includes a ring part 1221, a plurality of connection pins 1222 and a connection shaft 1223. The connection pins 1222 are disposed on a first surface of the ring part 1221 and extending outwardly from the first surface of the ring part 1221. The connection pins 1222 are corresponding to the mounting holes 1212 of the driving sleeve 121. The connection shaft 1223 is disposed on a second surface of the ring part 1221 and extending outwardly from the second surface of the ring part 1221. The connection pins 1222 are inserted into the corresponding mounting holes 1212 of the driving sleeve 121. Consequently, when the input terminal is rotated by the driving of a motor (not shown), the driving sleeve 121 and the connection shaft 1223 of the transmission shaft 122 are rotated synchronously.

The movable module 13 includes a connection bracket 132 and a sliding carrier 133. The connection bracket 132 is securely mounted on the surface of the sliding carrier 133, and the connection bracket 132 and the sliding carrier 133 can be moved together along the rail 114. The connection bracket 132 includes a bearing 1321, a first extension portion 1322 and a second extension portion 1323. The first extension portion 1322 and the second extension portion 1323 are arranged at two opposite sides of the bearing 1321. The sliding carrier 133 is movably coupled with the rail 114 on the base plate 111, so that the sliding carrier 133 together with the connection bracket 132 can be moved along the rail 114. The connection shaft 1223 of the transmission shaft 122 is accommodated in the bearing 1321 of the connection bracket 132. The screwdriver module 14 includes a screwdriver sleeve 141 and a screwdriver 142. The screwdriver sleeve 141 includes a first coupling part 1411 and a second coupling part 1412. The first coupling part 1411 is accommodated in the bearing 1321 of the connection bracket 132. Namely, portion of the screwdriver sleeve 141 is accommodated in the bearing 1321 of the connection bracket 132. Consequently, the screwdriver module 14 is coupled with the movable module 13 and the screwdriver module 14 together with the movable module 13 can be moved relative to the base plate 111. The connection shaft 1223 of the transmission shaft 122 is securely coupled with the first coupling part 1411 of the screwdriver sleeve 141. The screwdriver 142 is securely coupled with the second coupling part 1412 of the screwdriver sleeve 141. Consequently, the screwdriver 142, screwdriver sleeve 141 and the connection shaft 1223 of the transmission shaft 122 are rotated synchronously.

The elastic element 15 has two ends. One end of the elastic element 15 is connected with the first extension portion 1322 of the connection bracket 132, and the other end of the elastic element 15 is connected with the first fixing bracket 17. The first fixing bracket 17 is securely mounted on the inner surface of the base plate 111. When the connection bracket 132 together with the sliding carrier 133 are moved along the rail 114, the connection bracket 132 exerts a force upon the elastic element 15. Consequently, the elastic element 15 is compressed and an elastic restoring force is induced on the elastic element 15 for allowing the connection bracket 132 to be returned to the original position. The elastic element 15 has a specific coefficient of elasticity (i.e. Young's modulus). Preferably but not exclusively, the elastic element 15 is a spring.

The position sensor 16 includes a first sensing element 161 (i.e. fixing part) and a second sensing element 162 (i.e. moving part). The first sensing element 161 is securely mounted on the second fixing bracket 18. The second fixing bracket 18 is securely mounted on the inner surface of the base plate 111. The second sensing element 162 is mounted on the second extension portion 1323 of the connection bracket 132, and the second sensing element 162 is movably accommodated in the first sensing element 161. Consequently, the position sensor 16 can be employed to sensing the displacement of the connection bracket 132 according to the movement of the second sensing element 162 relative to the first sensing element 161. It is noted that the structure of the position sensor is not limited to the above-mentioned embodiment, various position sensor (for example an optical position sensor) can be employed for sensing the displacement of the connection bracket 132 according to the practical requirements.

Please refer to FIGS. 1A to 1C again. When the automatic screw tightening module 1 performs the screw operations and the input terminal is rotated by the driving of a motor (not shown), the driving sleeve 121, the transmission shaft 122 and the screwdriver sleeve 141 are rotated synchronously. Consequently, the screwdriver 142 are rotated to perform screw operations. When the screwdriver 142 of the automatic screw tightening module 1 is moved toward the object and contacts with the object for fastening the screw onto the object, the screwdriver 142 is bearing a pressure thereon. Under this circumstance, the screwdriver module 14 pushes the connection bracket 132 of the movable module 13 to move. Meanwhile, the connection bracket 132 together with the sliding carrier 133 are moved along the rail 114 on the base plate 111, and the connection bracket 132 exerts a force on the elastic element 15. Consequently, the elastic element 15 is compressed. In addition, the second sensing element 162 mounted on the second extension portion 1323 of the connection bracket 132 is moved relative to the first sensing element 161. Consequently, the displacement of the connection bracket 132 are acquired. Due to that the acquired displacement of the connection bracket 132 is equal to the deformation of the elastic element 15, so that the deformation of the elastic element 15 can be acquired.

According to the Hooke's law (see equation (1)), the restoring force of the elastic element 15 can be acquired according to the elasticity coefficient of the elastic element 15 and the deformation of the elastic element 15.

$$F=-kX \qquad (1)$$

where F is restoring force exerted by the elastic element, k is specific elasticity coefficient of the elastic element (i.e. a constant factor characteristic of the elastic element), and X is the deformation of the elastic element. Therefore, the applied force exerted on the object or the force exerted on the screwdriver 142 can be determined according to the elasticity coefficient of the elastic element 15 and the displacement acquired by the position sensor 16. When the automatic screw tightening module 1 determines that the level of applied force is over a preset level, the screw operation of the automatic screw tightening module 1 is disabled for preventing the damage of the objects. In some embodiments, the elastic elements 15 with different elasticity coefficients can be exchanged and employed in the automatic screw tightening module 1. Consequently, the measuring range of the applied force can be adjusted and extended according to the practical requirements.

Figure 2:
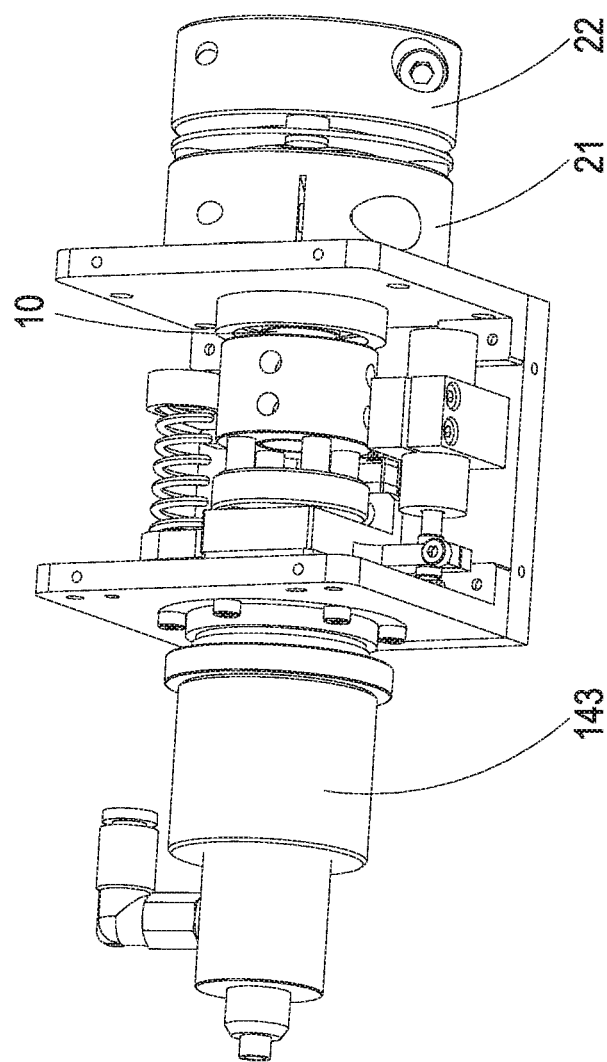
FIG. 2 is a schematic perspective view illustrating an automatic screw tightening module according to a second embodiment of the present invention.

FIG. 2 is a schematic perspective view illustrating an automatic screw tightening module according to a second embodiment of the present invention. Component parts and elements corresponding to those of the first embodiment are designated by identical numeral references, and detailed descriptions thereof are omitted. In comparison with the automatic screw tightening module 1 of FIGS. 1A to 1C, the automatic screw tightening module 1 of this embodiment further comprises a first shaft coupling device 21 and a second shaft coupling device 22. The input terminal of the input module 10 can be coupled with the rotation shaft of motor (not shown) via the first shaft coupling device 21 and the second shaft coupling device 22. When the rotation shaft of the motor (not shown) is a protrusion shaft, the rotation shaft of the motor can be accommodated in the mounting hole (not shown) of the second shaft coupling device 22. The input terminal of the input module 10 can be accommodated in the mounting hole (not shown) of the first shaft coupling device 21. The first shaft coupling device 21 and the second shaft coupling device 22 are coupled together. Consequently, the motor can drive the input module 10 to rotate via the first shaft coupling device 21 and the second shaft coupling device 22.

Figure 3A:
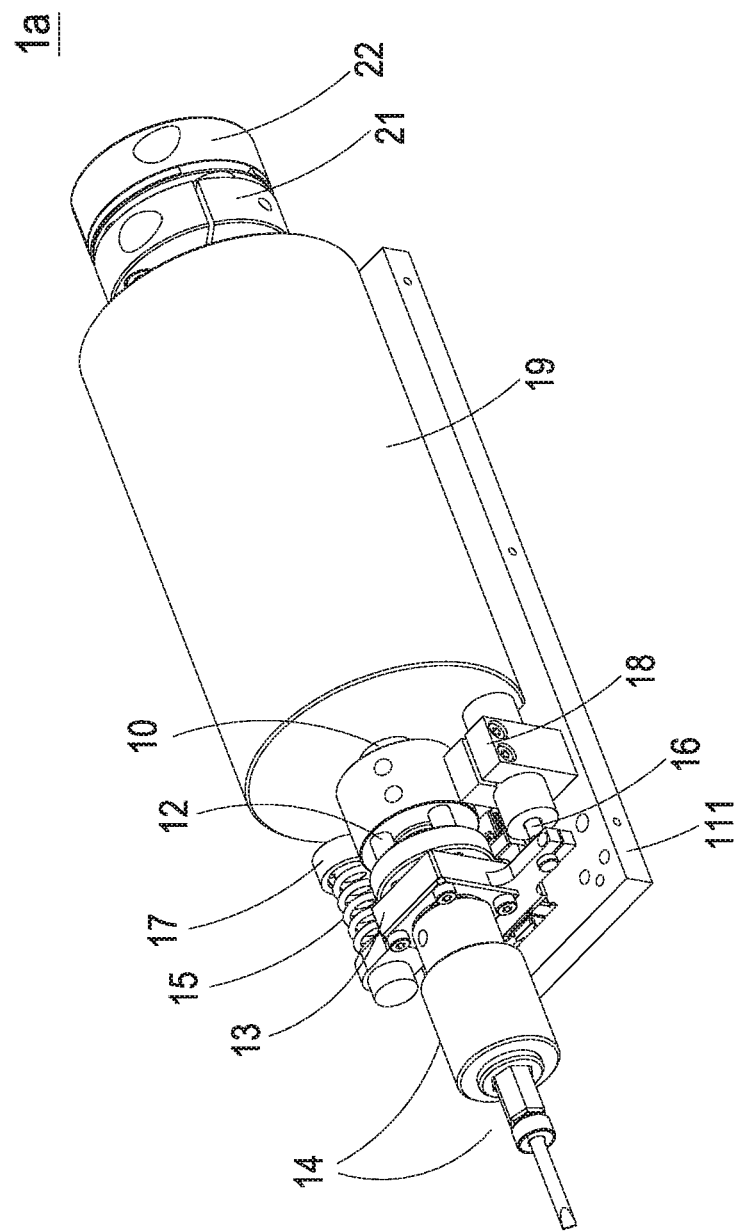
FIG. 3A is a schematic perspective view illustrating an automatic screw tightening module according to a third embodiment of the present invention.
Figure 3B:
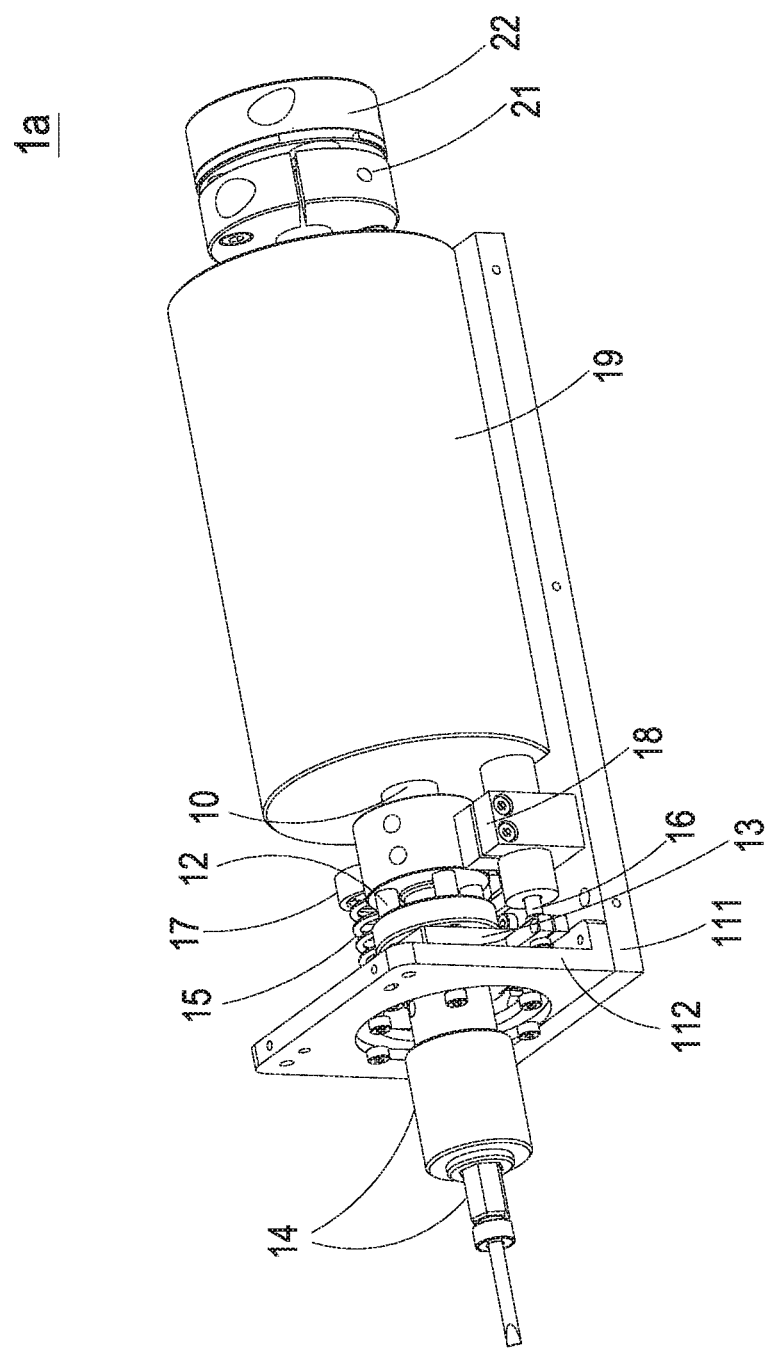
FIG. 3B is a schematic perspective view illustrating the automatic screw tightening module of FIG. 3A, wherein one side support plate is added.

FIG. 3A is a schematic perspective view illustrating an automatic screw tightening module according to a third embodiment of the present invention; and FIG. 3B is a schematic perspective view illustrating the automatic screw tightening module of FIG. 3A, wherein one side support plate is added. Component parts and elements corresponding to those of the first embodiment are designated by identical numeral references, and detailed descriptions thereof are omitted. In comparison with the automatic screw tightening module 1 of FIG. 2, the automatic screw tightening module 1*a* of this embodiment further comprises a torque sensor 19 for sensing the torque directly. The torque sensor 19 is coupled with the input terminal of the input module 10 directly. In some embodiments, the torque sensor 19 is coupled with the first shaft coupling device 21. By using the torque sensor 19, the torque of screwing the screw onto the object can be acquired by the screw tightening module 1*a* accurately. Comparing with the method of sensing the torque according to the prior art, the torque is determined based on the current of the electric motor. Consequently, the torque acquired by the inventive screw tightening module 1 is more accurate than that acquired by the method of the prior art.

Figure 4:
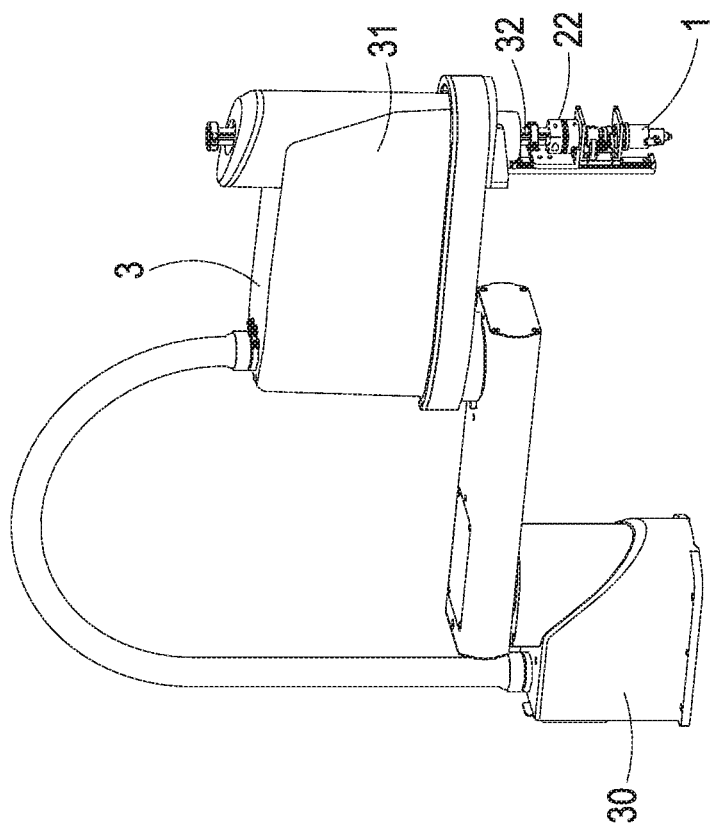
FIG. 4 is a schematic perspective view illustrating a robot manipulator according to a first embodiment of the present invention, wherein the robot manipulator is equipped with the screw tightening module of FIG. 2.

FIG. 4 is a schematic perspective view illustrating a robot manipulator according to a first embodiment of the present invention, wherein the robot manipulator is equipped with the screw tightening module of FIG. 2. As shown in FIGS. 1A to 1C, 2 and 4, the SCARA robot 4 (i.e. Selective Compliance Assembly Robot Arm or robot manipulator) includes an articulated arm 3 and the screw tightening module 1. The screw tightening module 1 can be detachably coupled to the distal end of the articulated arm 3 easily without changing the original structure and circuit of the articulated arm 3. The articulated arm 3 includes a base 30, a multi-axis mechanism 31 and an axle end 32. The screw tightening module 1 is coupled to the axle end 32. Preferably but not exclusively, the SCARA robot 4 is a four axis robot manipulator. The axle end 32 of the articulated arm 3 can drive the input module 10 to rotate, and the articulated arm 3 can move the screw tightening module 1 toward the object according to the control of the control unit of the SCARA robot 4. By using the SCARA robot 4, the screw tightening positions of the objects can be acquired accurately, and the applied forces on the objects can be well controlled for avoiding the damages of the objects. In addition, the screw tightening module 1 can be detachably coupled to the distal end of the articulated arm 3 easily without changing the original structure and circuit of the SCARA robot 4. The screw tightening module 1 of the SCARA robot 4 can be replaced with other tools on the distal end of the articulated arm 3 for performing required tasks. Consequently, the cost is reduced. It is noted that, the robot manipulator is not limited to the embodiment as mentioned above, other available robot manipulator for example Articulated robot or Delta robot can also be employed according to the practical requirements.

Figure 5:
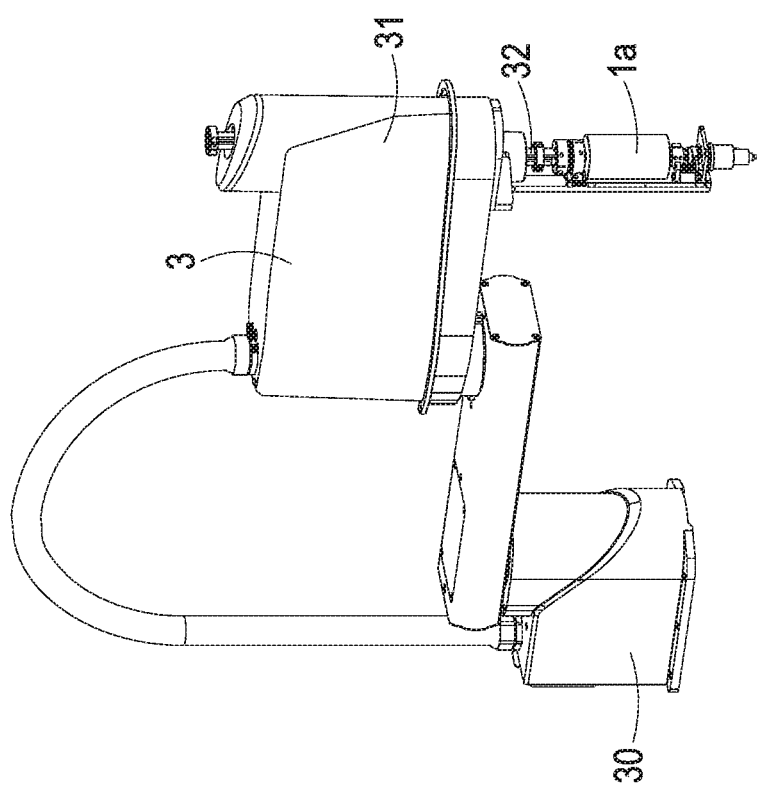
FIG. 5 is a schematic perspective view illustrating a robot manipulator according to a second embodiment of the present invention, wherein the robot manipulator is equipped with the screw tightening module of FIG. 3B.

FIG. 5 is a schematic perspective view illustrating a robot manipulator according to a second embodiment of the present invention, wherein the robot manipulator is equipped with the screw tightening module of FIG. 3B. As shown in FIGS. 3A, 3B and 5, the SCARA robot 4 (i.e. robot manipulator) includes an articulated arm 3 and the screw tightening module 1*a*. The screw tightening module 1*a* can be detachably coupled to the distal end of the articulated arm 3 easily without changing the original structure and circuit of the articulated arm 3. The articulated arm 3 includes a base 30, a multi-axis mechanism 31 and an axle end 32. The screw tightening module 1*a* is coupled to the axle end 32. Preferably but not exclusively, the SCARA robot 4 is a four axis robot manipulator. The axle end 32 of the articulated arm 3 can drive the input module 10 to rotate, and the articulated arm 3 can move the screw tightening module 1*a* toward the object according to the control of the control unit of the SCARA robot 4. By using the SCARA robot 4, the screw tightening positions of the objects can be acquired accurately, and the applied forces on the objects can be well controlled for avoiding the damages of the objects. In addition, the screw tightening module 1*a* can be detachably coupled to the distal end of the articulated arm 3 easily without changing the original structure and circuit of the SCARA robot 4. The screw tightening module 1*a* of the SCARA robot 4 can be replaced with other tools on the distal end of the articulated arm 3 for performing required tasks. Consequently, the cost is reduced. It is noted that, the robot manipulator is not limited to the embodiment as mentioned above, other available robot manipulator for example Articulated robot or Delta robot can also be employed according to the practical requirements.

Figure 6:
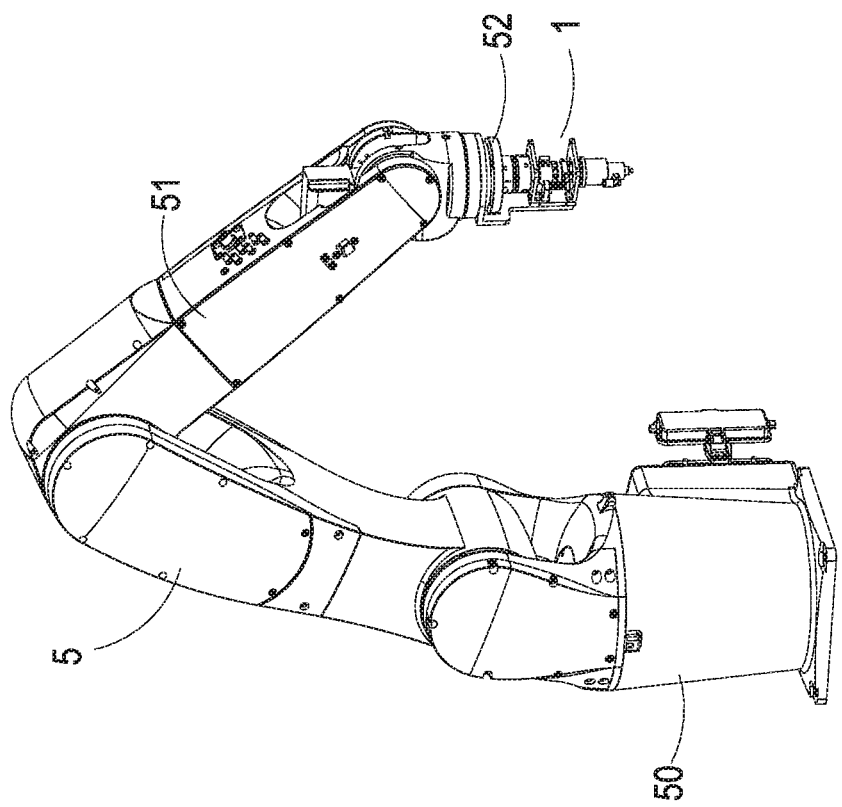
FIG. 6 is a schematic perspective view illustrating a robot manipulator according to a third embodiment of the present invention, wherein the robot manipulator is equipped with the screw tightening module of FIG. 2.

FIG. 6 is a schematic perspective view illustrating a robot manipulator according to a third embodiment of the present invention, wherein the robot manipulator is equipped with the screw tightening module of FIG. 2. As shown in FIGS. 1A to 1C, 2 and 6, the articulated robot 6 (i.e. robot manipulator) includes an articulated arm 5 and the screw tightening module 1. The screw tightening module 1 can be detachably coupled to the distal end of the articulated arm 5 easily without changing the original structure and circuit of the articulated arm 5. The articulated arm 5 includes a base 50, a multi-axis mechanism 51 and an axle end 52. The screw tightening module 1 is coupled to the axle end 52. Preferably but not exclusively, the articulated robot 6 is a six axis robot manipulator. The axle end 52 of the articulated arm 5 can drive the input module 10 to rotate, and the articulated arm 5 can move the screw tightening module 1 toward the object according to the control of the control unit of the articulated robot 6. By using the articulated robot 6, the screw tightening positions of the objects can be acquired accurately, and the applied forces on the objects can be well controlled for avoiding the damages of the objects. In addition, the screw tightening module 1 can be detachably coupled to the distal end of the articulated arm 5 easily without changing the original structure and circuit of the articulated robot 6. The screw tightening module 1 of the robot manipulator 6 can be replaced with other tools on the distal end of the articulated arm 5 for performing required tasks. Consequently, the cost is reduced. It is noted that, the robot manipulator is not limited to the embodiment as mentioned above, other available robot manipulator for example SCARA robot or Delta robot can also be employed according to the practical requirements.

FIG. 7 is a schematic perspective view illustrating a robot manipulator according to a fourth embodiment of the present invention, wherein the robot manipulator is equipped with the screw tightening module of FIG. 3B. As shown in FIGS. 3A, 3B and 7, the articulated robot 6 (i.e. robot manipulator) includes an articulated arm 5 and the screw tightening module 1*a*. The screw tightening module 1*a* can be detachably coupled to the distal end of the articulated arm 5 easily without changing the original structure and circuit of the articulated arm 5. The articulated arm 5 includes a base 50, a multi-axis mechanism 51 and an axle end 52. The screw tightening module 1*a* is coupled to the axle end 52. Preferably but not exclusively, the articulated robot 6 is a six axis robot manipulator. The axle end 52 of the articulated arm 5 can drive the input module 10 to rotate, and the articulated arm 5 can move the screw tightening module 1*a* toward the object according to the control of the control unit of the articulated robot 6. By using the articulated robot 6, the screw tightening positions of the objects can be acquired accurately, and the applied forces on the objects can be well controlled for avoiding the damages of the objects. In addition, the screw tightening module 1a can be detachably coupled to the distal end of the articulated arm 5 easily without changing the original structure and circuit of the articulated robot 6. The screw tightening module 1a of the articulated robot 6 can be replaced with other tools on the distal end of the articulated arm 5 for performing required tasks. Consequently, the cost is reduced. It is noted that, the robot manipulator is not limited to the embodiment as mentioned above, other available robot manipulator for example SCARA robot or Delta robot can also be employed according to the practical requirements.

Figure 8A:
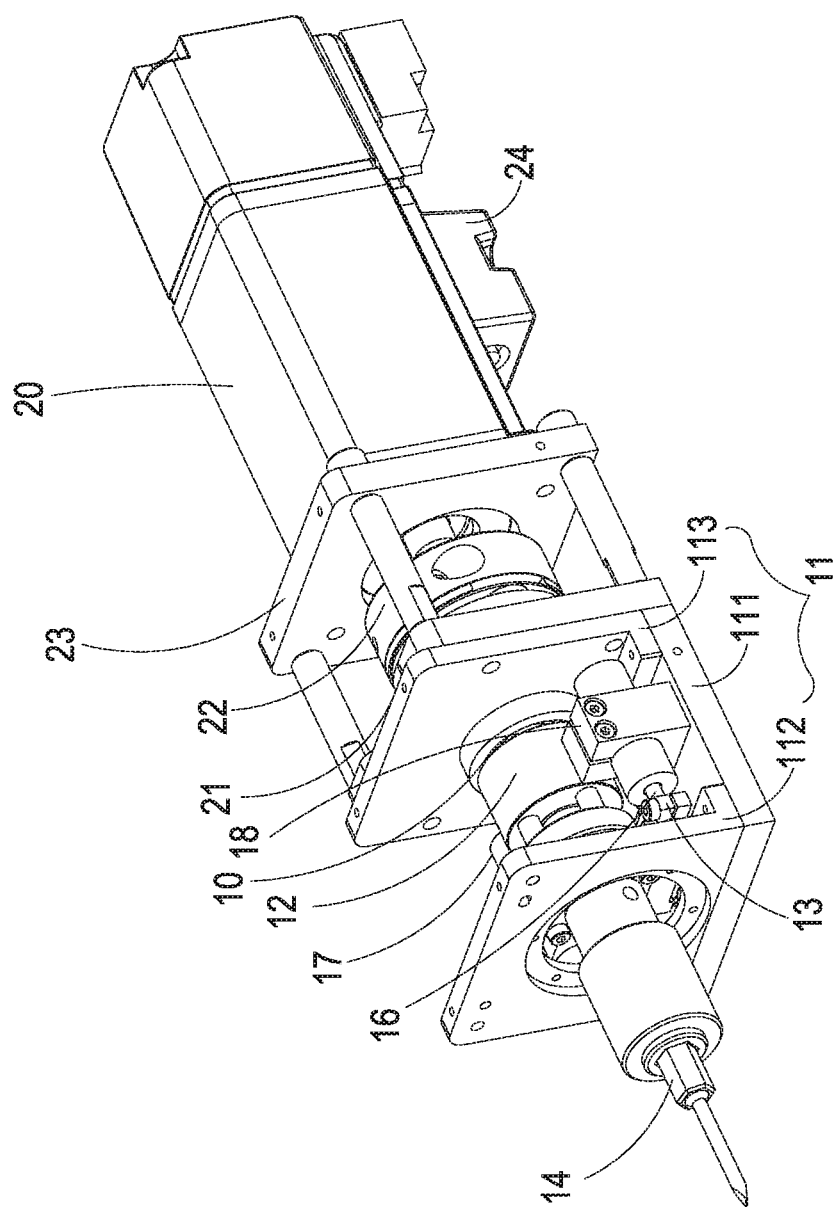
FIG. 8A is a schematic perspective view illustrating an automatic screw tightening module according to a fourth embodiment of the present invention.
Figure 8B:
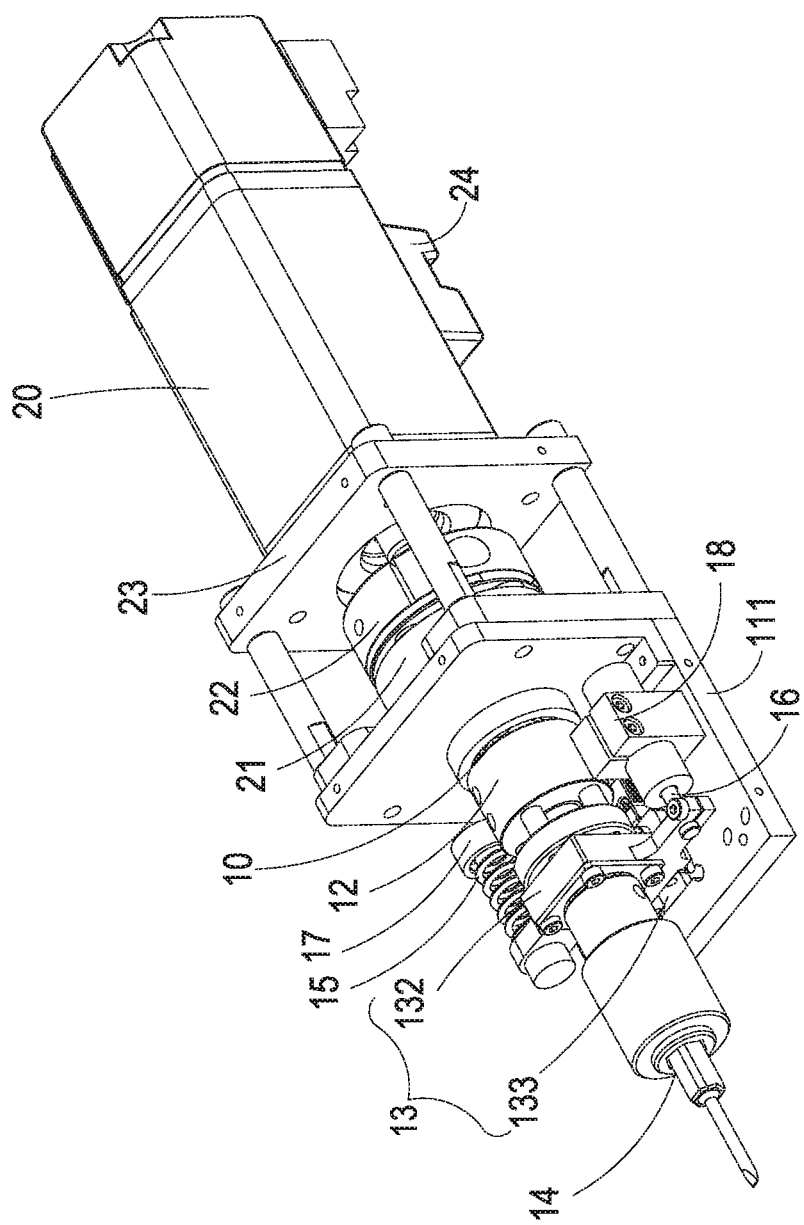
FIG. 8B is a schematic perspective view illustrating the automatic screw tightening module of FIG. 8A, wherein one side support plate is omitted.

FIG. 8A is a schematic perspective view illustrating an automatic screw tightening module according to a fourth embodiment of the present invention; and FIG. 8B is a schematic perspective view illustrating the automatic screw tightening module of FIG. 8A, wherein one side support plate is omitted. Component parts and elements corresponding to those of the first embodiment are designated by identical numeral references, and detailed descriptions thereof are omitted. In comparison with the automatic screw tightening module 1 of FIG. 2, the automatic screw tightening module 1c of this embodiment further comprises a motor 20, a frame 23 and a mounting element 24. The motor 20 is connected with the input module 10. In some embodiments, the motor 20 is connected with the input module 10 via the first shaft coupling device 21 and the second shaft coupling device 22. The frame 23 is covering the first shaft coupling device 21 and the second shaft coupling device 22 and connected with the housing of the motor 20. The mounting element 24 is configured to fasten with a corresponding coupling part of the articulated arm. Consequently, the automatic screw tightening module 1c can be detachably mounted to the articulated arm without changing the structure and circuit of the articulated arm.

Figure 9A:
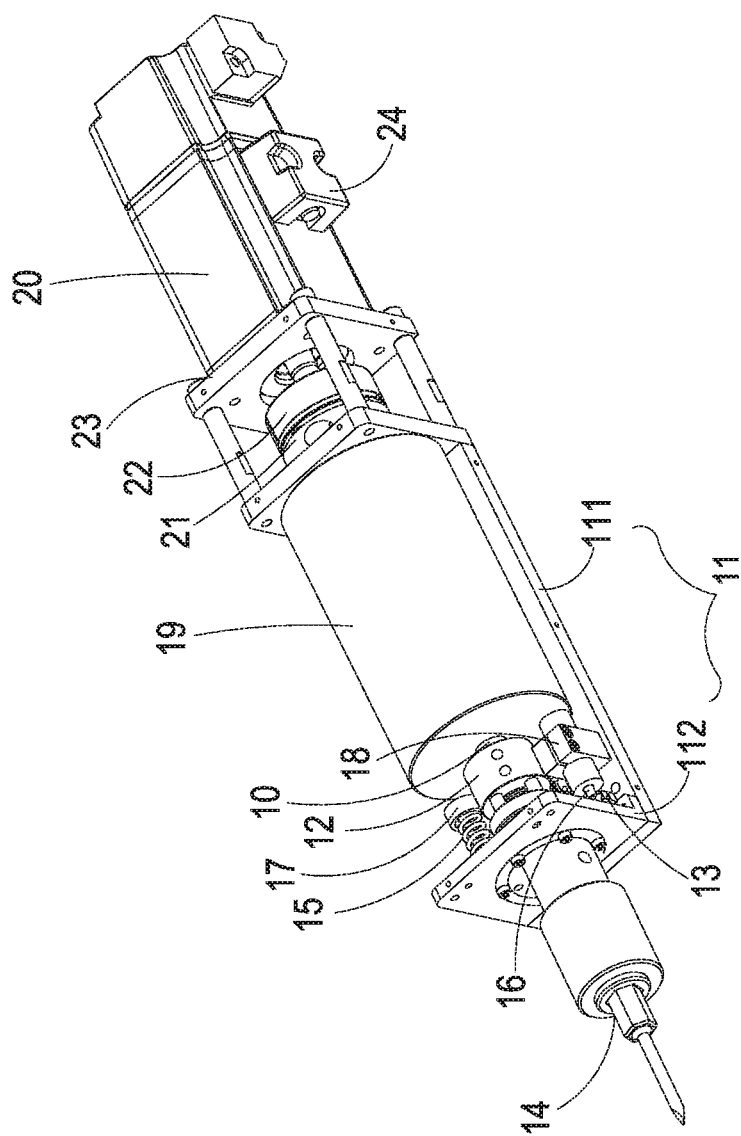
FIG. 9A is a schematic perspective view illustrating an automatic screw tightening module according to a fifth embodiment of the present invention.
Figure 9B:
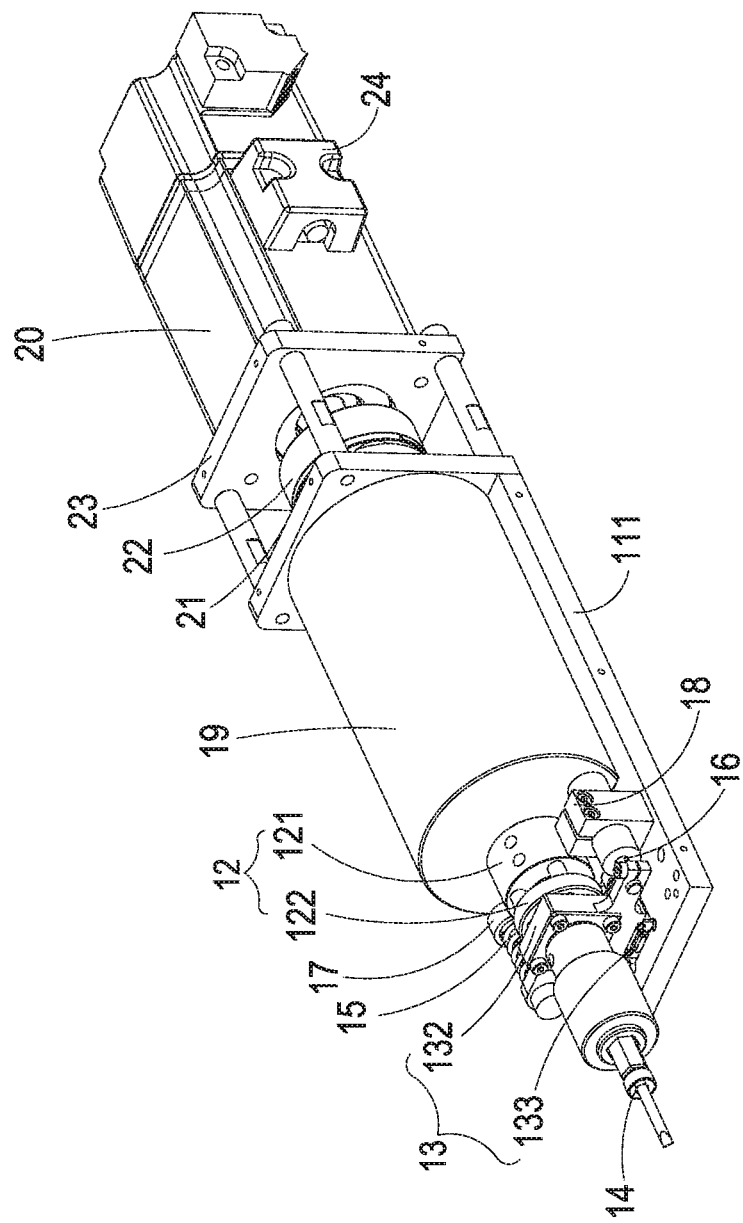
FIG. 9B is a schematic perspective view illustrating the automatic screw tightening module of FIG. 9A, wherein one side support plate is omitted.

FIG. 9A is a schematic perspective view illustrating an automatic screw tightening module according to a fifth embodiment of the present invention; and FIG. 9B is a schematic perspective view illustrating the automatic screw tightening module of FIG. 9A, wherein one side support plate is omitted. Component parts and elements corresponding to those of the first embodiment are designated by identical numeral references, and detailed descriptions thereof are omitted. In comparison with the automatic screw tightening module 1c of FIGS. 8A and 8B, the automatic screw tightening module 1d of this embodiment further comprises a torque sensor 19 for sensing the torque directly. The torque sensor 19 is coupled with the input terminal of the input module 10 directly. In some embodiments, the torque sensor 19 is coupled with the first shaft coupling device 21. By using the torque sensor 19, the torque of screwing the screw onto the object can be acquired by the screw tightening module 1d accurately. Comparing with the method of sensing the torque according to the prior art, the torque is determined based on the current of the electric motor. Consequently, the torque acquired by the inventive screw tightening module 1d is more accurate than that acquired by the method of the prior art.

Figure 10:
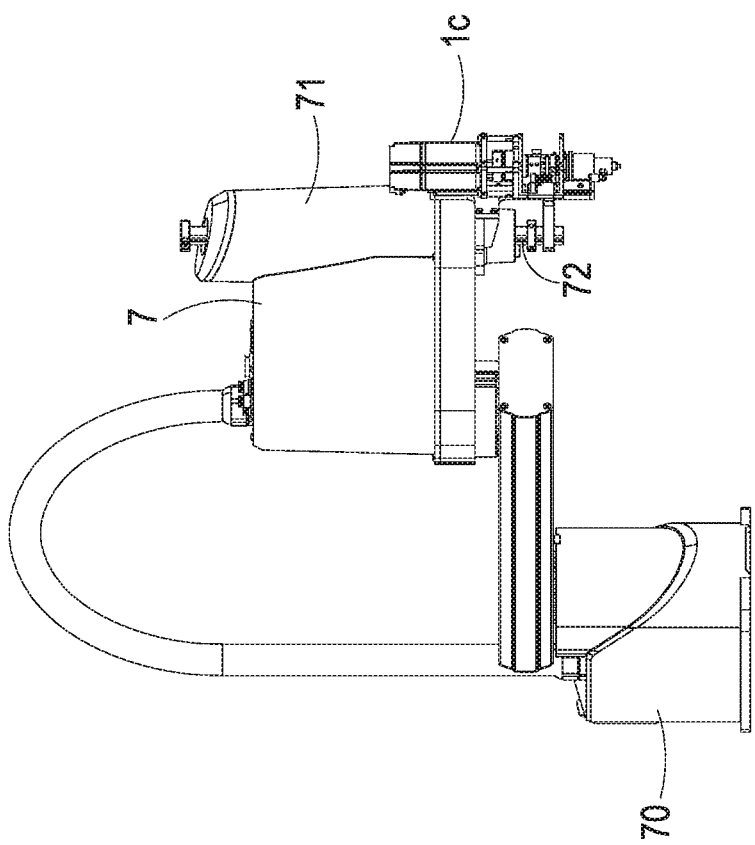
FIG. 10 is a schematic perspective view illustrating a robot manipulator according to a fifth embodiment of the present invention, wherein the robot manipulator is equipped with the screw tightening module of FIG. 8A.

FIG. 10 is a schematic perspective view illustrating a robot manipulator according to a fifth embodiment of the present invention, wherein the robot manipulator is equipped with the screw tightening module of FIG. 8A. As shown in FIGS. 8A, 8B and 10, the SCARA robot 8 (i.e. robot manipulator) includes an articulated arm 7 and the screw tightening module 1c. The screw tightening module 1c can be detachably coupled to the distal end of the articulated arm 7 easily without changing the original structure and circuit of the articulated arm 7. The articulated arm 7 includes a base 70, a multi-axis mechanism 71 and an axle end 72. The screw tightening module 1c is coupled to the axle end 72. Preferably but not exclusively, the SCARA robot 8 is a four axis robot manipulator. The motor 20 can drive the input module 10 to rotate, and the articulated arm 7 can move the screw tightening module 1c toward the object according to the control of the control unit of the SCARA robot 8. The operation of the motor is controlled by a controller of the SCARA robot 8 (not shown). By using the SCARA robot 8, the screw tightening positions of the objects can be acquired accurately, and the applied forces on the objects can be well controlled for avoiding the damages of the objects. In addition, the screw tightening module 1c can be detachably coupled to the distal end of the articulated arm 7 easily without changing the original structure and circuit of the SCARA robot 8. The screw tightening module 1c of the SCARA robot 8 can be replaced with other tools on the distal end of the articulated arm 7 for performing required tasks. Consequently, the cost is reduced. It is noted that, the robot manipulator is not limited to the embodiment as mentioned above, other available robot manipulator for example Cartesian robot, Gantry robot, Cylindrical robot, Spherical/Polar robot, Articulated robot, Parallel robot or Delta robot can also be employed according to the practical requirements.

Figure 11:
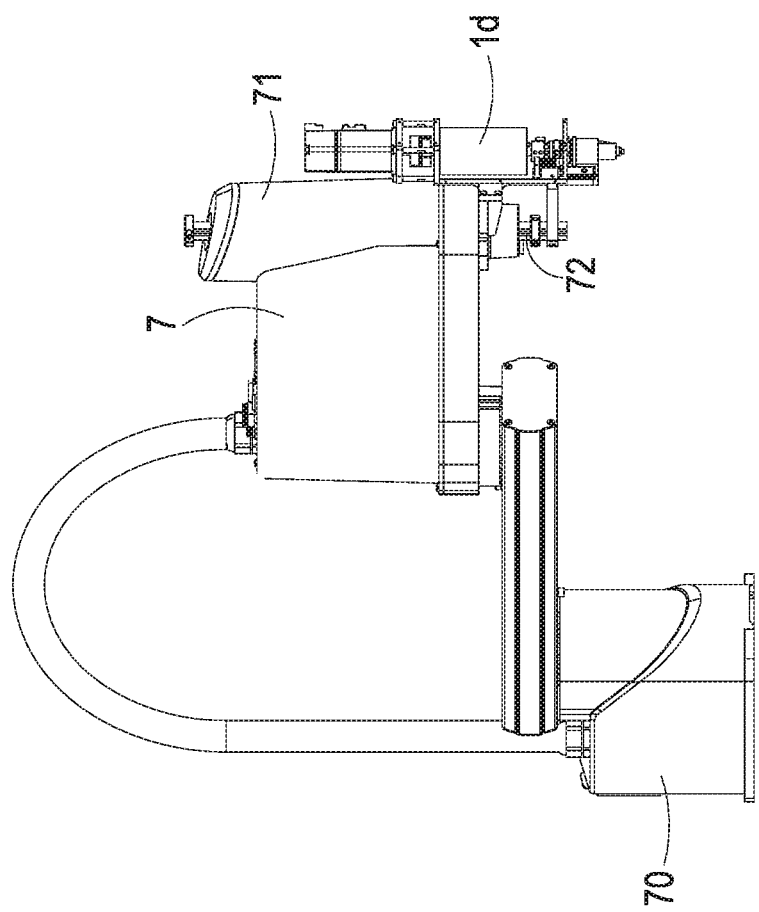
FIG. 11 is a schematic perspective view illustrating a robot manipulator according to a sixth embodiment of the present invention, wherein the robot manipulator is equipped with the screw tightening module of FIG. 9A.

FIG. 11 is a schematic perspective view illustrating a robot manipulator according to a sixth embodiment of the present invention, wherein the robot manipulator is equipped with the screw tightening module of FIG. 9A. As shown in FIGS. 9A, 9B and 11, the SCARA robot 8 (i.e. robot manipulator) includes an articulated arm 7 and the screw tightening module 1d. The screw tightening module 1d can be detachably coupled to the distal end of the articulated arm 7 easily without changing the original structure and circuit of the articulated arm 7. The articulated arm 7 includes a base 70, a multi-axis mechanism 71 and an axle end 72. The screw tightening module 1d is coupled to the axle end 72. Preferably but not exclusively, the robot manipulator 8 is a four axis robot manipulator. The motor 20 can drive the input module 10 to rotate, and the articulated arm 7 can move the screw tightening module 1d toward the object according to the control of the control unit of the SCARA robot 8. The operation of the motor is controlled by a controller of the SCARA robot 8 (not shown). By using the SCARA robot 8, the screw tightening positions of the objects can be acquired accurately, and the applied forces on the objects can be well controlled for avoiding the damages of the objects. In addition, the screw tightening module 1d can be detachably coupled to the distal end of the articulated arm 7 easily without changing the original structure and circuit of the SCARA robot 8. The screw tightening module 1d of the SCARA robot 8 can be replaced with other tools on the distal end of the articulated arm 7 for performing required tasks. Consequently, the cost is reduced. It is noted that, the robot manipulator is not limited to the embodiment as mentioned above, other available robot manipulator for example Cartesian robot, Gantry robot, Cylindrical robot, Spherical/Polar robot, Articulated robot, Parallel robot or Delta robot can also be employed according to the practical requirements.

Figure 12:
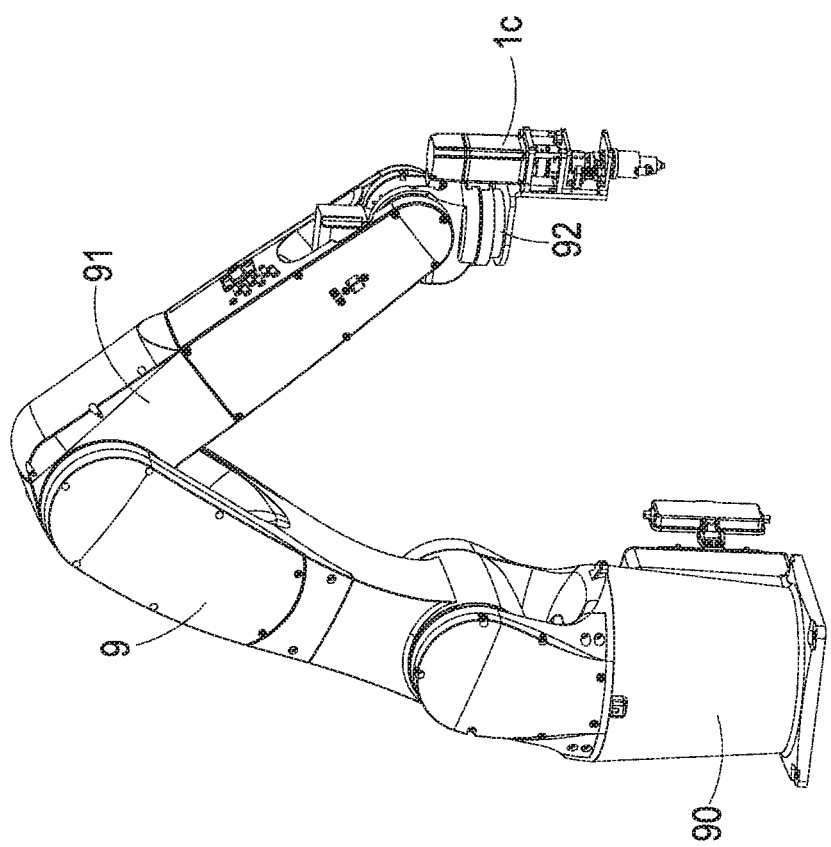
FIG. 12 is a schematic perspective view illustrating a robot manipulator according to a seventh embodiment of the present invention, wherein the robot manipulator is equipped with the screw tightening module of FIG. 8A.

FIG. 12 is a schematic perspective view illustrating a robot manipulator according to a seventh embodiment of the present invention, wherein the robot manipulator is equipped with the screw tightening module of FIG. 8A. As shown in FIGS. 8A, 8B and 12, the articulated robot 8' (i.e. robot manipulator) includes an articulated arm 9 and the screw tightening module 1c. The screw tightening module 1c can be detachably coupled to the distal end of the articulated arm 9 easily without changing the original structure and circuit of the articulated arm 9. The articulated arm 9 includes a base 90, a multi-axis mechanism 91 and an axle end 92. The screw tightening module 1c is coupled to the axle end 92. Preferably but not exclusively, the articulated robot 8' is a six axis robot manipulator. The motor 20 can drive the input module 10 to rotate, and the articulated arm 9 can move the screw tightening module 1c toward the object according to the control of the control unit of the articulated robot 8'. The operation of the motor is controlled by a controller of the articulated robot 8' (not shown). By using the articulated robot 8', the screw tightening positions of the objects can be acquired accurately, and the applied forces on the objects can be well controlled for avoiding the damages of the objects. In addition, the screw tightening module 1c can be detachably coupled to the distal end of the articulated arm 9 easily without changing the original structure and circuit of the articulated robot 8'. The screw tightening module 1c of the articulated robot 8' can be replaced with other tools on the distal end of the articulated arm 9 for performing required tasks. Consequently, the cost is reduced. It is noted that, the robot manipulator is not limited to the embodiment as mentioned above, other available robot manipulator for example Cartesian robot, Gantry robot, Cylindrical robot, Spherical/Polar robot, SCARA robot, Parallel robot or Delta robot can also be employed according to the practical requirements.

Figure 13:
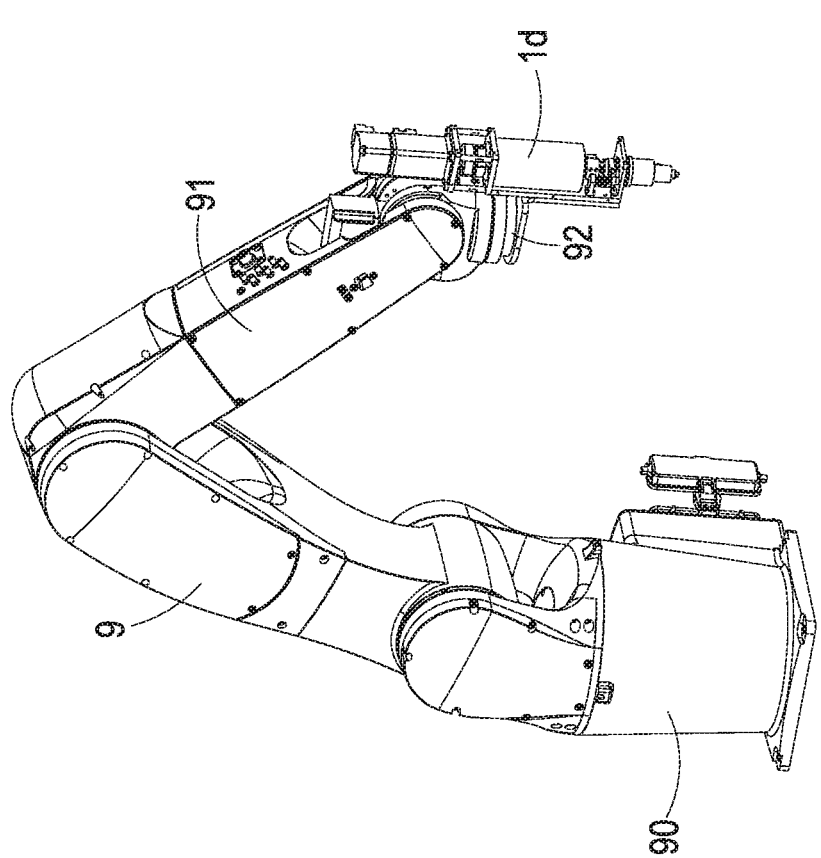
FIG. 13 is a schematic perspective view illustrating a robot manipulator according to an eighth embodiment of the present invention, wherein the robot manipulator is equipped with the screw tightening module of FIG. 9A.

FIG. 13 is a schematic perspective view illustrating a robot manipulator according to an eighth embodiment of the present invention, wherein the robot manipulator is equipped with the screw tightening module of FIG. 9A. As shown in FIGS. 9A, 9B and 13, the articulated robot 8' (i.e. robot manipulator) includes an articulated arm 9 and the screw tightening module 1d. The screw tightening module 1d can be detachably coupled to the distal end of the articulated arm 9 easily without changing the original structure and circuit of the articulated arm 9. The articulated arm 9 includes a base 90, a multi-axis mechanism 91 and an axle end 92. The screw tightening module 1d is coupled to the axle end 92. Preferably but not exclusively, the robot manipulator 8' is a six axis robot manipulator. The motor 20 can drive the input module 10 to rotate, and the articulated arm 9 can move the screw tightening module 1d toward the object according to the control of the control unit of the articulated robot 8'. The operation of the motor is controlled by a controller of the articulated robot 8' (not shown). By using the articulated robot 8', the screw tightening positions of the objects can be acquired accurately, and the applied forces on the objects can be well controlled for avoiding the damages of the objects. In addition, the screw tightening module 1d can be detachably coupled to the distal end of the articulated arm 9 easily without changing the original structure and circuit of the articulated robot 8'. The screw tightening module 1d of the articulated robot 8' can be replaced with other tools on the distal end of the articulated arm 9 for performing required tasks. Consequently, the cost is reduced. It is noted that, the robot manipulator is not limited to the embodiment as mentioned above, other available robot manipulator for example Cartesian robot, Gantry robot, Cylindrical robot, Spherical/Polar robot, SCARA robot, Parallel robot or Delta robot can also be employed according to the practical requirements.

From the above descriptions, the present invention provides an automatic screw tightening module and a robot manipulator employing the same with reduced cost. By using the inventive automatic screw tightening module and the robot manipulator, the screw tightening positions of the objects can be acquired accurately, and the applied forces on the objects can be well controlled for avoiding the damages of the objects. In addition, the automatic screw tightening module can be detachably coupled to the distal end of the articulated arm easily or can be additionally mounted to the articulated arm without changing the original structure and circuit of the robot manipulator. The screw tightening module of the robot manipulator can be replaced with other tools on the distal end of the articulated arm for performing required tasks. Consequently, the cost is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic screw tightening module, comprising:
   a plate assembly comprising a base plate and a rail, wherein the base plate has a recess disposed on an inner surface thereof, the rail is securely mounted on a bottom surface of the recess;
   an input module comprising an input terminal;
   a screwdriver module comprising a screwdriver and a screwdriver sleeve, wherein the screwdriver is securely coupled with the screwdriver sleeve;
   a transmission module connected with the input terminal and the screwdriver sleeve for allowing the input terminal, the transmission module and the screwdriver sleeve to be rotated synchronously;
   a movable module movably disposed on the base plate, wherein the movable module comprises a bearing, and portion of the screwdriver sleeve is accommodated in the bearing, so that the screwdriver module and the movable module are coupled with each other and moved relative to the base plate, and the movable module further comprises:
      a sliding carrier movably coupled with the rail; and
      a connection bracket securely mounted on a surface of the sliding carrier, and moving along the rail together with the sliding carrier, wherein the connection bracket comprises the bearing, a first extension portion and a second extension portion, and the first extension portion and the second extension portion are arranged at two opposite sides of the bearing;
   an elastic element disposed on the base plate, and connected with the movable module; and
   a position sensor disposed on the base plate for sensing a displacement of the movable module.

2. The automatic screw tightening module according to claim 1, wherein the automatic screw tightening module acquires a force that the screwdriver exerts on an object during screw tightening according to the displacement and an elasticity coefficient of the elastic element.

3. The automatic screw tightening module according to claim 1, wherein the plate assembly comprises:
   a first side support plate securely mounted on a first side edge of the base plate for fixing the screwdriver module; and a second side support plate securely mounted on a second side edge of the base plate for supporting the input module, wherein the base plate, the first side support plate and the second side support plate define an accommodation space for mounting at least the input module, the transmission module, the movable module, the elastic element and the position sensor.

4. The automatic screw tightening module according to claim 1, further comprising a first fixing bracket securely mounted on the base plate, wherein one end of the elastic element is connected with the first fixing bracket, and the other end of the elastic element is connected with the first extension portion, wherein the connection bracket exerts a force upon the elastic element when the connection bracket together with the sliding carrier are moved along the rail.

5. The automatic screw tightening module according to claim 1, further comprising a second fixing bracket securely mounted on the base plate, wherein the position sensor comprises:
a first sensing element securely mounted on the second fixing bracket; and
a second sensing element securely mounted on the second extension portion, and movably accommodated in the first sensing element.

6. The automatic screw tightening module according to claim 1, wherein the transmission module comprises:
a driving sleeve comprising an axle hole and a plurality of mounting holes; and
a transmission shaft comprising:
a ring part having a first surface and a second surface;
a plurality of connection pins disposed on the first surface of the ring part, and extending outwardly from the first surface, wherein the connection pins are corresponding to and inserted into the mounting holes of the driving sleeve, respectively; and
a connection shaft disposed on the second surface of the ring part, and extending outwardly from the second surface, wherein the connection shaft is securely coupled with the screwdriver sleeve;
wherein the input terminal is partially accommodated in the axle hole of the driving sleeve and securely coupled with the driving sleeve, wherein the input terminal, the driving sleeve and the transmission shaft are rotated synchronously.

7. The automatic screw tightening module according to claim 6, wherein the screwdriver sleeve comprises:
a first coupling part accommodated in the bearing, wherein the connection shaft of the transmission shaft is securely coupled with the first coupling part; and
a second coupling part securely coupled with the screwdriver;
wherein the screwdriver, the screwdriver sleeve and the connection shaft of the transmission shaft are rotated synchronously.

8. The automatic screw tightening module according to claim 1, further comprising a torque sensor coupled with the input terminal of the input module.

9. The automatic screw tightening module according to claim 1, further comprising:
a first shaft coupling device connected with the input terminal of the input module;
a second shaft coupling device coupled with the first shaft coupling device;
a motor connected with the input module via the first shaft coupling device and the second shaft coupling device and configured to drive the input module; and
a frame covering the first shaft coupling device and the second shaft coupling device, and connected with the motor.

10. A robot manipulator, comprising:
an articulated arm comprising an axle end; and
an automatic screw tightening module detachably coupled to the axle end of the articulated arm, and comprising:
a plate assembly comprising a base plate and a rail, wherein the base plate has a recess disposed on an inner surface thereof, the rail is securely mounted on a bottom surface of the recess;
an input module comprising an input terminal;
a screwdriver module comprising a screwdriver and a screwdriver sleeve, wherein the screwdriver is securely coupled with the screwdriver sleeve;
a transmission module connected with the input terminal and the screwdriver sleeve for allowing the input terminal, the transmission module and the screwdriver sleeve to be rotated synchronously;
a movable module movably disposed on the base plate, wherein the movable module comprises a bearing, and portion of the screwdriver sleeve is accommodated in the bearing, so that the screwdriver module and the movable module are coupled with each other and moved relative to the base plate, and the movable module further comprises:
a sliding carrier movably coupled with the rail; and
a connection bracket securely mounted on a surface of the sliding carrier, and moving along the rail together with the sliding carrier, wherein the connection bracket comprises the bearing, a first extension portion and a second extension portion, and the first extension portion and the second extension portion are arranged at two opposite sides of the bearing;
an elastic element disposed on the base plate, and connected with the movable module; and
a position sensor disposed on the base plate for sensing a displacement of the movable module.

11. The robot manipulator according to claim 10, wherein the robot manipulator is a four axis robot manipulator or a six axis robot manipulator.

12. The robot manipulator according to claim 10, wherein the articulated arm further comprises a base and a multi-axis mechanism, and the axle end is configured to drive the input module.

13. The robot manipulator according to claim 10, wherein the automatic screw tightening module further comprises a mounting element configured for securely mounting the automatic screw tightening module on the articulated arm.

* * * * *